Figure 1:
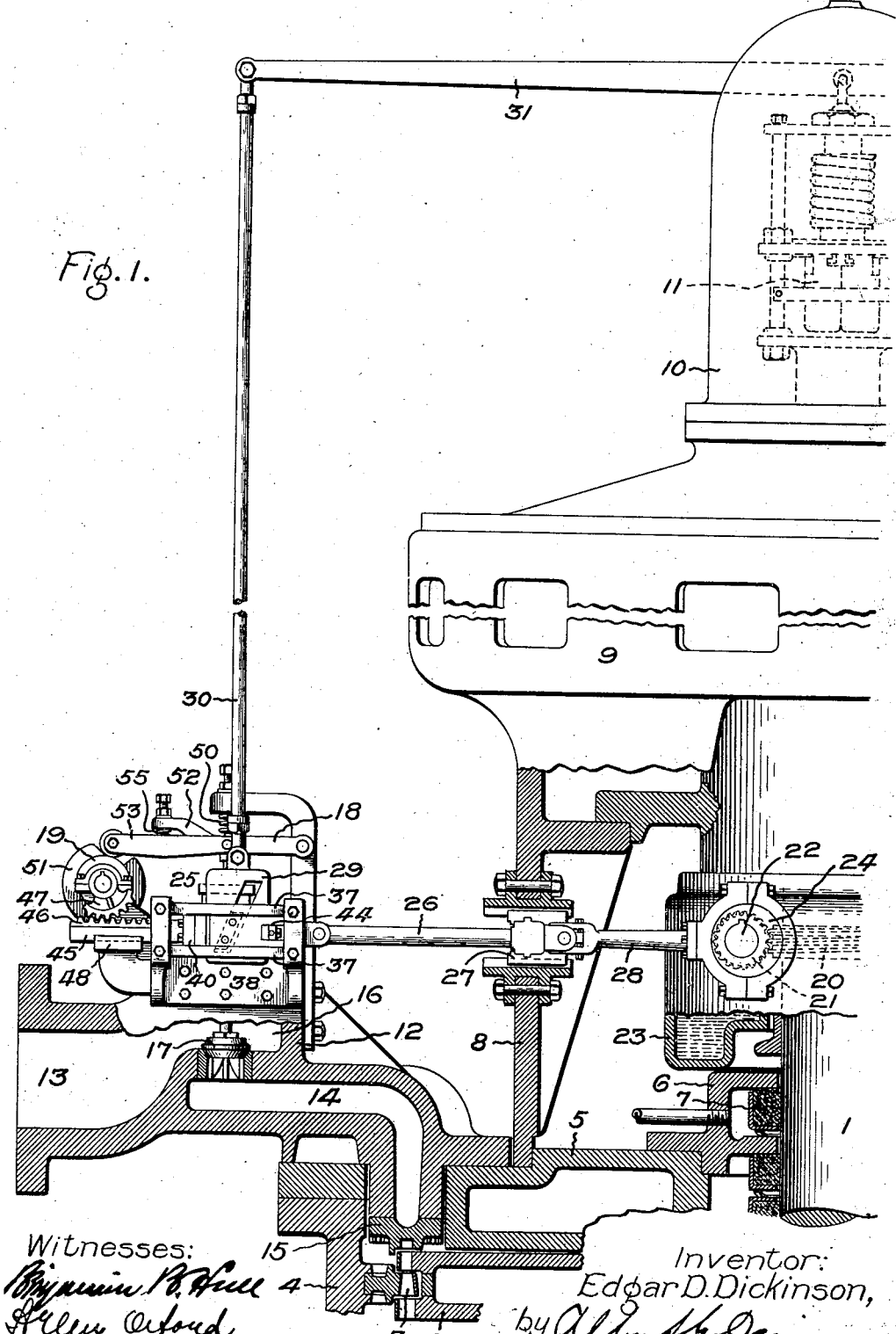

No. 845,339. PATENTED FEB. 26, 1907.
E. D. DICKINSON.
GOVERNING MECHANISM FOR TURBINES.
APPLICATION FILED SEPT. 1, 1905.

5 SHEETS—SHEET 1.

Witnesses:
Inventor:
Edgar D. Dickinson,
by Albert G. Davis Att'y.

No. 845,339. PATENTED FEB. 26, 1907.
E. D. DICKINSON.
GOVERNING MECHANISM FOR TURBINES.
APPLICATION FILED SEPT. 1, 1905.
5 SHEETS—SHEET 2.
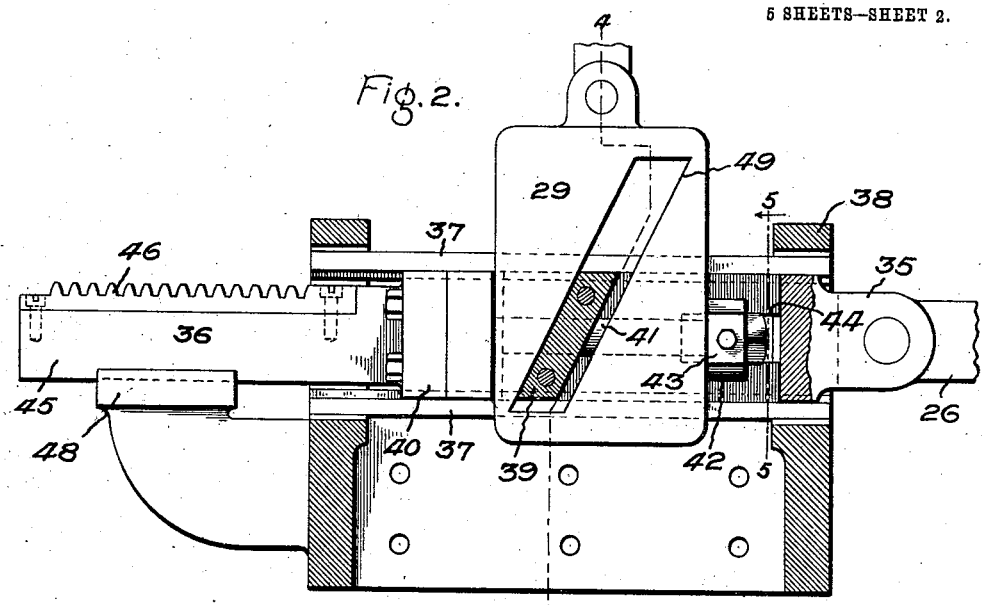
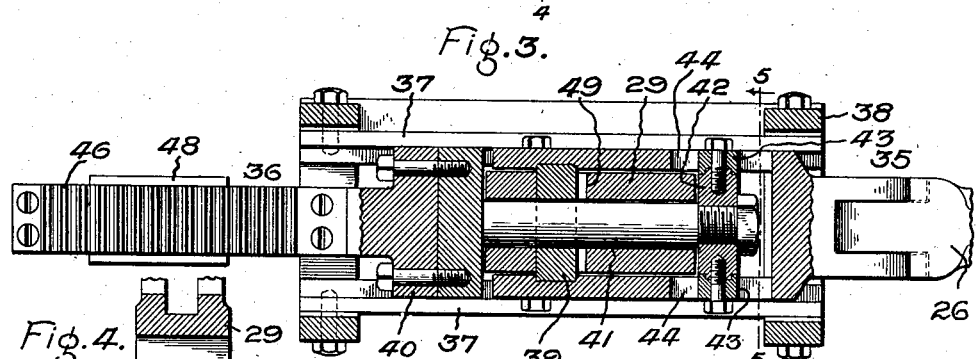
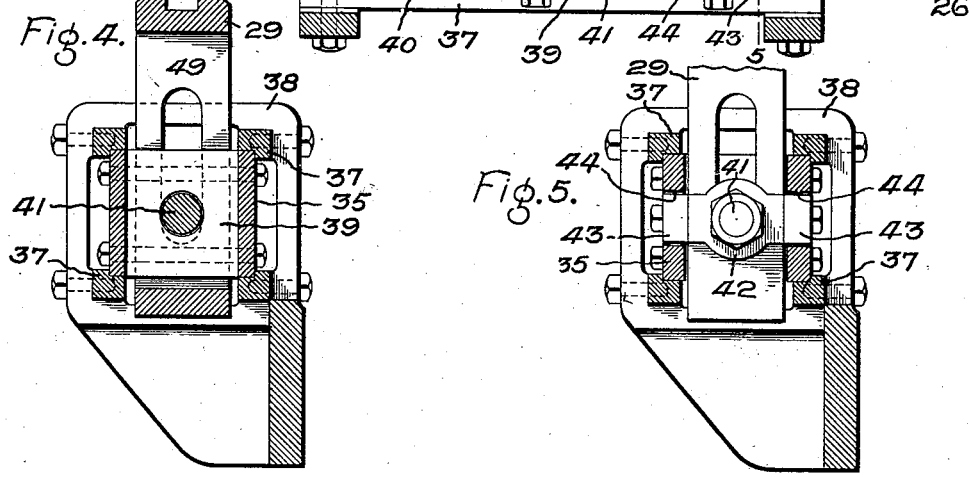
Witnesses:
Benjamin B. Hull
Helen Orford
Inventor:
Edgar D. Dickinson,
by Albert G. Davis
Att'y.

No. 845,339. PATENTED FEB. 26, 1907.
E. D. DICKINSON.
GOVERNING MECHANISM FOR TURBINES.
APPLICATION FILED SEPT. 1, 1905.

5 SHEETS—SHEET 3.

Witnesses:
Inventor:
Edgar D. Dickinson.
by Albert G. Davis
Att'y.

No. 845,339. PATENTED FEB. 26, 1907.
E. D. DICKINSON.
GOVERNING MECHANISM FOR TURBINES.
APPLICATION FILED SEPT. 1, 1905.
5 SHEETS—SHEET 4.
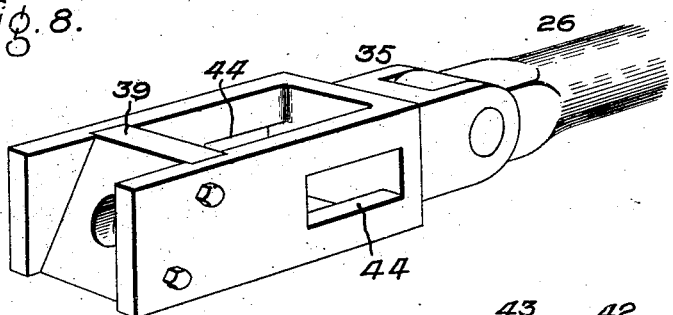
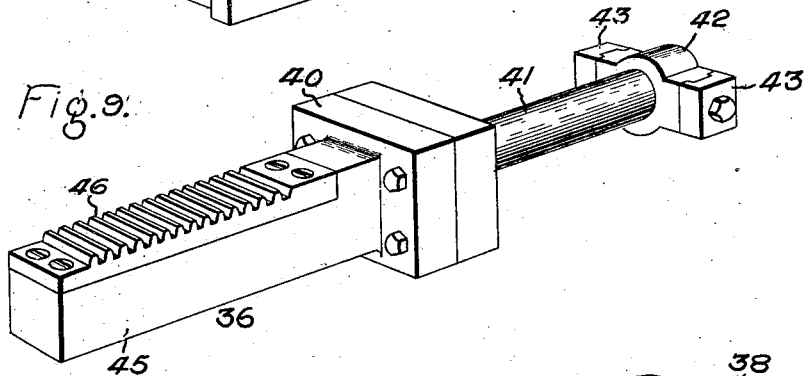
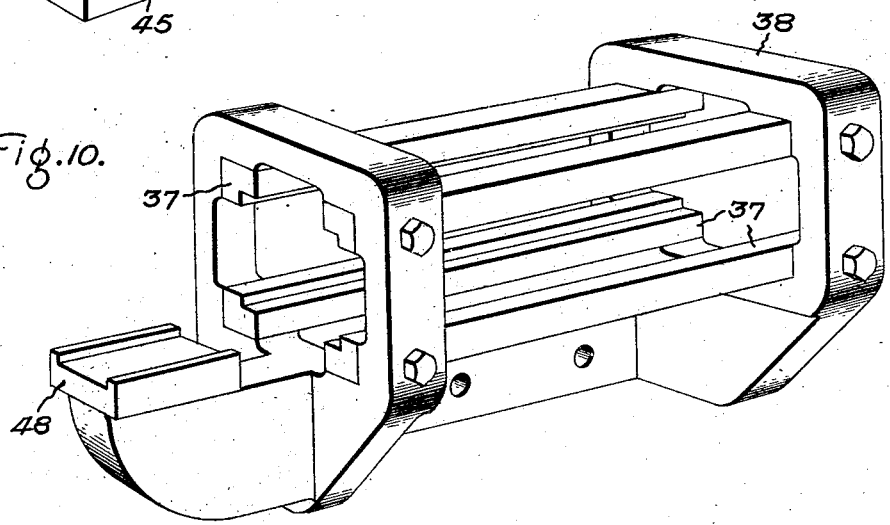
Witnesses:
Inventor:
Edgar D. Dickinson,
by Albert G. Davis
Atty.

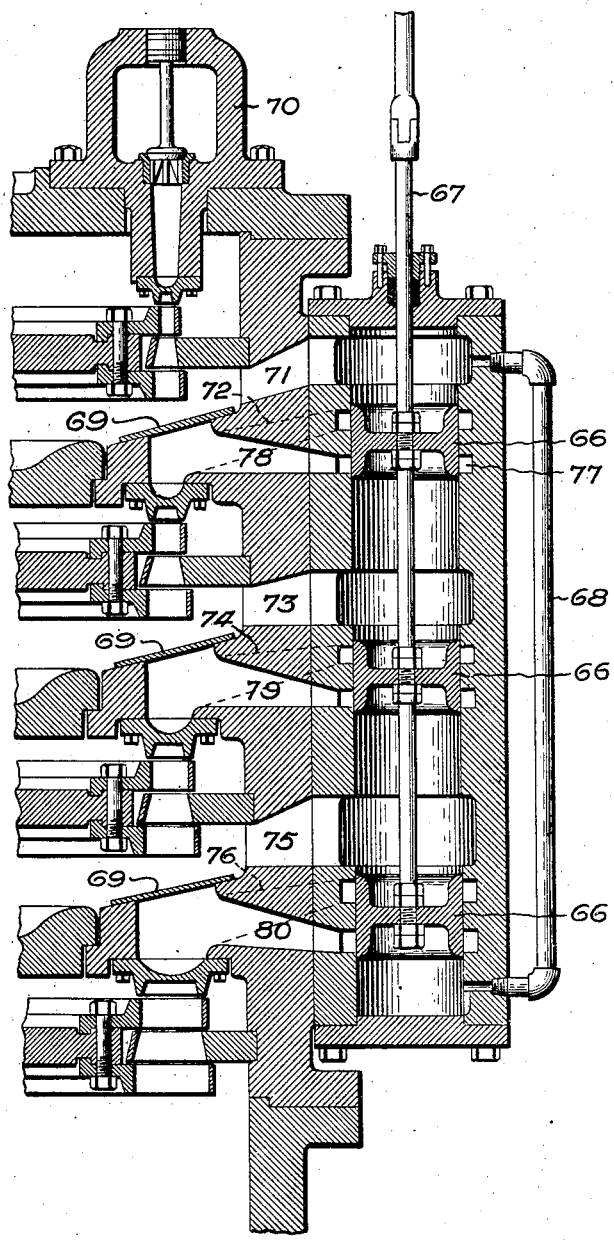

UNITED STATES PATENT OFFICE.

EDGAR D. DICKINSON, OF SCHENECTADY, NEW YORK, ASSIGNOR TO GENERAL ELECTRIC COMPANY, A CORPORATION OF NEW YORK.

GOVERNING MECHANISM FOR TURBINES.

No. 845,339.　　　　Specification of Letters Patent.　　　　Patented Feb. 26, 1907.

Application filed September 1, 1905. Serial No. 276,668.

*To all whom it may concern:*

Be it known that I, EDGAR D. DICKINSON, a subject of the King of Great Britain, residing at Schenectady, county of Schenectady, State of New York, have invented certain new and useful Improvements in Governing Mechanism for Turbines, of which the following is a specification.

The present invention relates to governing mechanism for turbines, and more especially to those of the elastic-fluid type, and has for its object to provide a governing mechanism in which the valves are quickly and positively opened or closed as the demand for motive fluid changes, and this with a mechanism that is efficient and reliable in operation and at the same time is simple and rugged in character.

In carrying out my invention as many admission-valves are provided as desired to properly control the passage of motive fluid through the nozzles or other devices to the turbine. In addition to this one or more stage-valves may be provided for one or more succeeding stages after the first, which is or are opened or closed as the demand for motive fluid changes. Ordinarily a less number of stage-valves will be provided in a given stage than admission-valves, since it is desirable to simplify the construction and reduce the number of parts as much as possible; but the invention is not to be understood as being limited to any specific number. One, two, three, or more stages of a multistage-machine may be provided with these valves in the different stages and preferably in the same plane, so that a common stem may be employed. In this manner when one stage-valve is opened or closed the corresponding valves in the other stages will be similarly moved. Again, such a construction tends to reduce the number of parts and decrease the cost of manufacture and labor of erecting and cost of maintenance.

The admission-valves may be arranged in one or more groups and preferably all of the valves in a group are contained in the same chest. The valves in each group may be operated directly or indirectly by a cam or equivalent device. When operated directly by a cam, the ends of the valve-stems projecting through the chest may be provided with antifriction-rollers engaging the cam. When operated indirectly—as, for example, where it is desired to multiply the power or motion—levers are provided wihch are attached to or engage the valve-stems and are suitably pivoted at one point and engage with the cam at another. Each of the valves is or may be provided with an outside spring, which tends at all times to close it. Locating the closing-springs outside of the steam-space prevents them from losing their temper where superheated steam is employed and at the same time renders them accessible. A further advantage resides in the fact that the dimensions of the springs can be such as are best suited to the work. Each valve may control one, two, or more nozzles or nozzle-sections, which convert more or less of the pressure of the motive fluid into velocity and discharge it with its velocity unimpaired to the wheel-buckets. Preferably the nozzles discharge the motive fluid in the form of an unbroken column against the buckets to avoid eddy-currents, spill, and other losses, and as the load changes the valves vary the cross-sectional area of the column, without, however, varying its velocity.

The cam or other device is preferably common to and moves all the valves of a group and is in turn connected to or moved by an actuator which positively moves it to and fro, and thus positively opens and closes the valves in predetermined succession or order as the load changes. The actuator may be separately driven, or it may receive its motion indirectly or directly from the main shaft of the turbine, the latter arrangement being preferable, since a practically unlimited amount of power is thus rendered available. A satisfactory means for driving the actuator comprises a worm on the shaft of the turbine, meshing with a worm-wheel that in turn drives an eccentric, the rod of which is connected directly or indirectly to the actuator. The worm-gearing is preferably inclosed in a fluid-tight casing containing a suitable lubricant. By means of this arrangement the number of strokes per minute of the actuator can be anything that is desired. Ordinarily the actuator will move more slowly than the shaft, for obvious reasons. The actuator, which comprises two principal parts, as will appear later, may with advantage have a right-line reciprocating motion; but it may have any other suitable motion, if desired. The actuator, or some part of it, should be constantly in motion, since by so doing it will move the valves without loss of time in response to the load changes. In other words, no time is lost in overcoming inertia or sticking, and the valves will quickly respond to the new conditions of operation.

The cam has a step-by-step movement, since the valves are successively operated both in opening and closing, while the actuator has a constant to-and-fro movement. From this it will be seen that the cam and the actuator cannot be rigidly connected together. Furthermore, under certain conditions the cam must have a greater or less (usually greater) angular movement than it would be possible to obtain by a direct connection. In order to connect and disconnect the cam and actuator as the demand for motive fluid varies, the actuator is made in two principal members or parts, which for convenience may be termed "primary" and "secondary." The primary member is connected to and is constantly driven by the main shaft or other source of power. The secondary member is connected to the cam, and hence has a step-by-step motion. The primary and secondary members are normally free to move with respect to each other. In the present illustration of my invention the members move toward and away from each other. In order to move the cam when one or more valves are to be opened or closed to satisfy the load conditions, a connector is provided which connects or locks the principal members of the actuator and is itself controlled by the speed-governor. The load on the governor is small, because it merely controls the connector while the energy for moving the actuator and the valves is transmitted from the main turbine-shaft. When the load conditions are satisfied by a given number of open valves, the governor causes the connector to release or unlock the principal members of the actuator, and thereafter the parts are free to move relatively to each other without varying the number of valves in service. The secondary member of the actuator is connected to and moves the cam. The form of this connection will differ in different cases. Where the movement of the cam is small, a simple lever may suffice; but where the movement is considerable gearing or equivalent devices may be employed. The connector has a definite position for each position of the cam, and therefore for each of the admission-valves. The same is also true of the secondary member of the actuator.

The parts of the actuator are provided with one or more suitable guides. Where two or more guides are provided, they may be separate or not. The use of a common guide is preferable, because it reduces the number of parts and simplifies the alinement and insures good operation. Between the primary and the secondary members of the actuator is a certain amount of lost motion, which motion is equal, at least, to the throw or movement of the primary member of the actuator, so that the latter can move without moving the cam when the load conditions are satisfied by a given number of open valves. When the load changes, the governor, which may be driven directly or indirectly by the main shaft, moves the connector to a point where it locks or connects the members of the actuator, and thus moves the cam in one direction or the other as the conditions of load demand. To state the matter in a different way, the transmission of motion from the primary actuator to the cam can only take place through the connector, and the position of the connector as regulated by the governor determines how little or how much the cam will be moved on a given stroke or cycle of the actuator. The connector may be made in a variety of ways without departing from the invention, so long as the feature of connecting or locking and disconnecting or unlocking the part or parts transmitting motion from a suitable source to the cam in accordance with load changes is preserved. When considered in a different and perhaps more limited sense, the connector can be made in a variety of ways so long as the feature of transforming a continuous motion into a step-by-step motion either forward or backward or first forward and then backward is preserved.

The nozzle or admission valves are unbalanced in the closed position, and when of relatively large diameter and subjected to heavy pressure the effort required to open them is considerable. To reduce the amount of work required to open the valves, each may with advantage be made in two principal parts, a primary and a secondary, one constituting a pilot-valve, the other the main valve. In opening, the cam first raises the small pilot-valves from their seats, which permits the steam or other fluid pressure to balance the main valves wholly or in large part, and thereafter the main valves are opened. In closing, the main valves are seated first and then the pilot-valves. One way of effecting this result is to use the pilot-valve as a means for opening and closing the admission-valve through a lost-motion connection. The lever for operating each of the admission-valves is made in two parts which are capable of a certain amount of independent movement. Between the parts of the lever is a spring so arranged that as the lever is moved by the cam it is placed under stress, and when this stress exceeds a certain amount the pilot-valve opens with a snap, and thus prevents the valve and its seat from cutting, as would be the case if it opened slowly. After the pilot-valve is opened the pressures on the main valve are largely balanced, and further movement of the lever opens it. The valves are closed by suitable outside closing-springs having means for adjusting them. In event of stage-valves being provided they may be opened by means of the cam and closed by one or more springs or equivalent devices.

In the normal operation of elastic-fluid turbines of the jet type some of the valves are open, some are closed, and at least one valve is opening and closing frequently for regulating purposes. All things being equal, the greater the number of admission-valves the more nearly a given number of open valves will satisfy the load conditions. The use of a large number of nozzle-valves is objectionable, however, on account of multiplicity of small parts, original cost, and also that of maintenance. By using the pilot and nozzle valves arranged in the manner above specified I am able to obtain the benefits of a large number of nozzle-valves without the objections above specified—that is to say, one of the pilot or primary elements of the valves will open or close when only a small change in the amount of steam is desired. To look at the matter in a different way, each nozzle-valve is made in two parts, a primary and a secondary, one of which varies the admission by a small amount, the other by a considerably larger amount.

The cam described is of the oscillatory type; but unless limited thereto in the claims my invention is to be construed as being broad enough to include other forms of cams or mechanical devices for actuating the valves.

Figure 6:
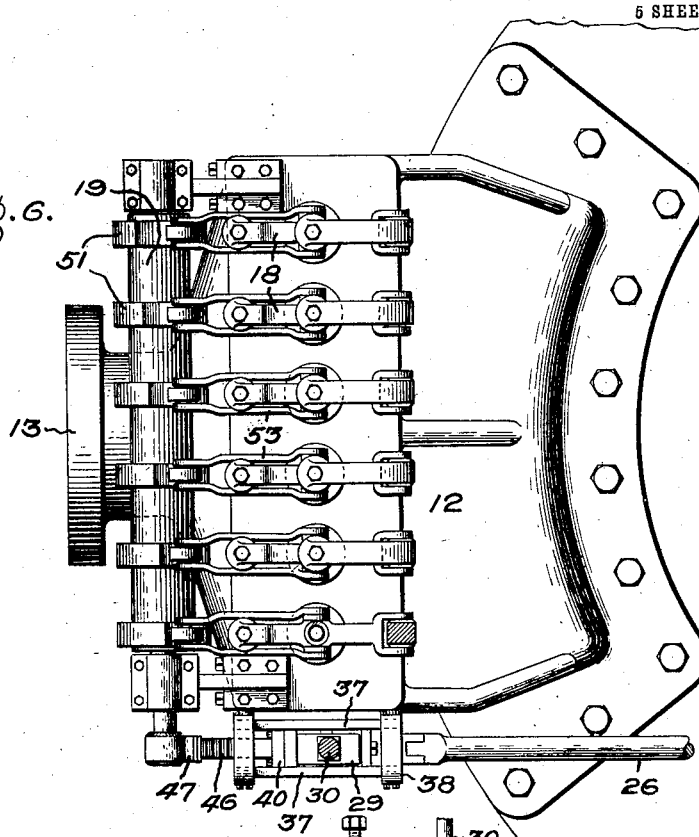
Figure 7:
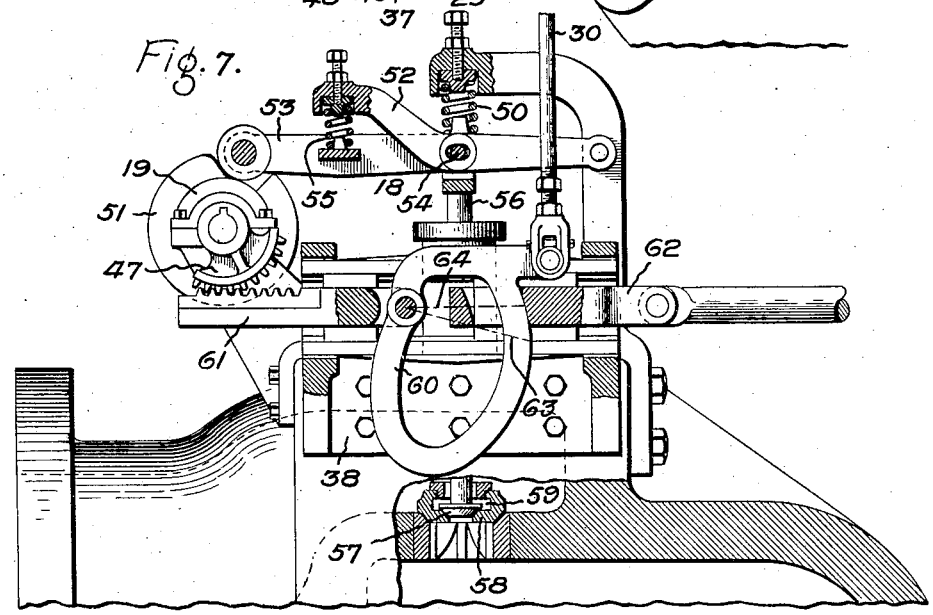

In the accompanying drawings, which are illustrative of my invention, Figure 1 is a view, partially in elevation and partially in section, of a part of a turbine operating on the impact principle, the particular machine being of the Curtis type. Fig. 2 is a longitudinal section through the actuator for moving the valves. Fig. 3 is also a longitudinal section through the actuator, but on a plane at right angles to that of Fig. 2. Fig. 4 is a cross-section on the line 4 4 of Fig. 2. Fig. 5 is a cross-section on the line 5 5 of Figs. 2 and 3. Fig. 6 is a plan view of the valve-chest and the cam and other parts for operating the valves. Fig. 7 is a detail view, partly in section, of a slightly-modified form of connector for uniting the primary and secondary members of the actuator. Fig. 8 is a perspective view of the primary member of the actuator. Fig. 9 is a perspective view of the secondary member of the actuator. Fig. 10 is a perspective view of the guides for the actuator, and Fig. 11 is a sectional view through the stage-valve.

1 represents the main shaft of the turbine, upon which the wheels 2 are mounted. Each of the wheels is provided with a row of peripheral buckets, and between the buckets are intermediate buckets 3. The intermediate buckets are supported by the casing 4. The upper end of the casing is provided with a suitable head or cover 5, and mounted thereon and surrounding the main shaft is a casing 6, containing carbon packing-rings 7. The turbine is divided by partitions or diaphragms into as many stages as are desired, each stage being provided with the necessary nozzles and controlling-valves.

Mounted on top of the head of the machine is a stool 8, which carries the generator 9. The upper end of the generator-casing is provided with a cover or head, upon which is supported the dome 10. The latter surrounds the shaft-governor 11, mounted on the main shaft 1. Steam or other elastic fluid is admitted to the turbine from a valve-chest 12, the latter being bolted to the wheel-casing. Fluid is admitted to the valve-chest by the conduit 13 and flows through suitable passages 14 to the nozzle or nozzles 15. The nozzle is preferably of the sectionalized type and is arranged to convert the pressure of the motive fluid into velocity and discharge it in the form of a solid column against the wheel-buckets. Each of the passages 14 has one or more nozzle-sections, and they are separate one from the other, although they receive steam from a common chamber 16 in the chest. The passage of steam to the nozzles is controlled or regulated by a plurality of admission-valves 17 of similar construction. Each of these valves is provided with a stem which extends through the casing and is connected to a lever 18. The levers are suitably pivoted at one end, and at the other end engage with and are moved by a cam 19, the latter being mounted in suitable bearings carried by the chest.

Formed on a sleeve mounted on the main shaft is a worm 20, (shown in dotted lines,) which meshes with a worm-wheel 21, carried by the shaft 22. The worm and worm-wheel are inclosed in a casing 23, containing oil or other lubricating fluid. At the point where the shaft 22 passes through the wall of the casing it is suitably packed to prevent leakage.

On the outer end of the shaft is mounted an eccentric 24, which is maintained in constant motion when the turbine is in operation. Motion from the eccentric is imparted to the actuator 25 by suitable connecting means. When the connector and the eccentric can be placed close together, the eccentric may be connected directly to the actuator; but where the parts are separated by a considerable distance, as in the present instance, a connecting-rod 26 is provided, one end of which is connected to the connector and the other end to the cross-head 27. The cross-head is directly connected to the eccentric-strap by the rod 28. The actuator 25 comprises two principal parts, as will be referred to hereinafter, which parts are connected or disconnected by the connector 29, the latter being raised and lowered by the rod 30, that is connected to the lever 31. The lever 31 is connected to and is moved by the shaft-governor.

Referring more particularly to Figs. 2 to 5, inclusive, and 8 to 10, inclusive, the actuator 25 is formed in two principal parts 35 and 36. The former may be termed the "primary" actuator, and the latter the "secondary." The primary actuator is connected to the eccentric and is constantly moved to and fro in the guides 37, of which four are provided. These guides are mounted in a frame 38, that is bolted to the valve-chest. The left-hand end of the primary actuator is forked, and extending between and connecting the forks is a perforated block 39. The latter is adapted to engage the connector 29, actuated by the shaft-governor, and to transmit motion from the primary to the secondary actuator. The secondary actuator comprises a head 40, that slides to and fro in the guides 37. The right-hand end of the head is provided with a cylindrical extension 41, that passes through the orifice in the block 39 of the primary actuator, and is provided with a collar or head 42, which is adapted to engage with the connector 29. The collar is provided with projections 43, that fit into and are movable in the slots 44 in the primary actuator. These projections act as guides and assist in preserving the alinement of the parts. From the left-hand side of the head 40 of the secondary actuator extends a projection 45, that carries the rack 46, the latter meshing with the gear 47, Fig. 1, carried by one end of the cam-shaft. This projection is provided on its inner surface with a guide 48.

The connector 29, Fig. 2, is provided with a slot 49, having diagonal walls, and extending through the slot is the block 39 on the primary actuator. Between this block and the side wall of the slot is a certain amount of space which constitutes a lost motion. This lost motion should be equal to the throw of the eccentric 24, so that when the parts are as shown in Fig. 2 the primary actuator can reciprocate without imparting motion to the secondary actuator 36 and its connected cam. If the connector 29 is lowered during the outward stroke of the primary actuator, it will on the return stroke of the actuator cause the secondary actuator 36 to be moved to the left. Conversely, if the connector 29 is raised from a given position, the right-hand wall of the slot 49 will assume a new position with respect to the block 39. Hence on the outward stroke of the primary actuator the connector 29 and the secondary actuator 36 and its connected parts will be moved to the right. When the load conditions are satisfied by a certain number of open valves and their controlled nozzles, the primary actuator will be reciprocating to and fro at, say, one hundred strokes per minute and the secondary actuator will remain stationary. As soon, however, as the load changes, the lever 31 will raise or lower the connector 29, and the secondary actuator will be moved either to the left or the right, depending on whether more or less steam is required. Under ordinary conditions of operation some of the admission-valves will be open, some of them will be closed, and at least one of them will be opening and closing at more or less frequent intervals to do the regulating. From this it follows that for every definite position of the connector there will be a corresponding position of the cam-shaft and the valves operated thereby. The parts are preferably so arranged with respect to each other that a single stroke of the primary actuator will be sufficient to open or close one valve, and the relation of the shaft-governor to the lever 31 will be such that the connector 29 will be raised or lowered a definite amount for a definite change in speed.

In laying out the parts for this governor care should be exercised to choose such angles for the block 39 and the walls of the slot 49 that the tendency for the connector to be raised by the action of one upon the other during a given stroke of the actuator is reduced to a minimum.

Referring to Fig. 6, the parts are shown in plan. 12 represents the valve-chest, and 18 the levers for actuating the valves. Each of the levers is provided with a suitable support or pivot, which support is extended over the lever to form a support for the closing-spring 50. The free end of the lever is provided with an antifriction-roller which engages with one of the cam projections 51 on the cam 19. Each of the levers is made in two principal parts 52 and 53, which are connected together by the pivot 54. Between the free end of the lever 52 and the intermediate portion of the lever 53 is an adjustable compression-spring 55, which is so arranged that when the cam 19 is moved about its axis to the right, Fig. 7, it will first compress the spring 55 and open the pilot-valve, and after the stress exceeds a certain amount the effect of the cam will be transmitted directly to the lever 52 and thence to the stem 56 of the valve.

Instead of providing a valve of the ordinary construction for controlling the nozzles I prefer to employ a valve comprising a main valve and a pilot-valve. (Best shown in Fig. 7.) The pilot-valve 57 is connected directly to the stem 56, and between the pilot-valve and the main valve is a certain amount of lost motion. The main valve 58 is provided with a seat for the pilot-valve and also with ports or passages 59 and suitable guides for directing its up and down movements. As constructed, when the valve-stem 56 is raised it moves the pilot-valve 57 off from its seat. This permits steam to rush through the ports 59 and balance in a large measure the pressures on opposite sides of the main valve, after which the main valve is raised and steam flows freely to the passage 14, connected with the nozzle or nozzle-section.

When the stress exerted by the spring 55 is sufficient to overcome the pressure on the pilot-valve, the latter will open with a snap-like action. This is due to the fact that as soon as the valve is lifted slightly from its seat it is overbalanced because the entire under surface is exposed to the steam-pressure. The effort required to open the main valve is comparatively small because the opening of the pilot-valve causes it to be largely balanced. By means of this construction the labor involved in raising the main valves is considerably lessened. In closing, the main valve is seated first, and thereafter the pilot-valve. I consider this to be a desirable form of valve; but my invention is not to be construed in all respects as being limited thereto.

In Fig. 7 I have shown a slight modification in the form of the connector employed to connect and disconnect the primary and secondary parts of the actuator. In this figure, 60 represents the connector that is actuated by the governor through the connecting-rod 30. The connector is made in the form of a cam which is pivotally secured to the secondary part 61 of the actuator, the said part being geared or otherwise connected to the cam-shaft. The primary part 62 of the actuator comprises a head that is adapted to be reciprocated to and fro by an eccentric or other motor. This head is slotted to receive the connector 60. With the parts in the position shown the primary actuator is free to move to and fro without imparting movement to the secondary actuator. Assume, however, that a change in load causes the connector 60 to be turned about its pivot until the dotted line 63 coincides with the longitudinal axis of the primary actuator. The distance measured on the line 63 is greater than the distance to the outer surface of the cam-measures on the line 64. It follows from this that the secondary actuator will on the end stroke of the primary actuator be moved by an amount equal to the difference in length of these two lines. Assuming that the connector 60 had been moved to a point where the line 63 coincided with the axis of the primary actuator and the load changed so as to bring the parts to the position shown in Fig. 4, it follows that the first movement to the right of the actuator would pull the connector 40 and its attached parts to the right. In other words, the actuator pushes the connector and its attached parts in opening the valves and pulls the connector and its attached parts in closing the valves. The valves are closed by the closing-springs 50; but before they can be rendered effective it is necessary for the antifriction-rollers to pass off from the cam projections.

In Fig. 11 I have shown a number of stage-valves connected to the same stem for controlling the passage of fluid from one stage to another in response to changes in load as defined by the shaft-governor. 65 represents the valve-casing, which may form a part of the wheel-casing or be attached thereto, as desired. This casing contains one or more piston stage-valves depending upon the number of stages to be controlled. In the present illustration three of these valves are shown, all of which are mounted upon the stem 67. Since the pressures on these piston-valves would have a tendency to force the valves downward at all times, I connect the upper end of the valve-casing to the lower by means of the pipe 68. In this manner the valves may be substantially balanced. The valve-rod 67 is connected to a suitable lever, which lever is acted upon by the cam 19 in a manner to depress the valve when the load on the turbine reaches a predetermined amount. The valves are so set on the spindle that additional nozzles are simultaneously placed in service in the different stages. In order to prevent the motive fluid from passing from one stage to another without doing useful work, the nozzles under the control of the valves are covered by plates 69 and only receive steam from the stage-valves. The passage of steam through that portion or portions of the turbine controlled by the stage-valves is as follows: It enters from the chest 70 and flows past the controlling valve or valves to the nozzles and the wheels of the first stage. From there it flows through the passage 71 and past the valve 66 into the dotted-line passage 72, thence through the nozzle connected therewith which is located beyond or back of the nozzle shown in section, thence through the wheel-buckets of the second stage and into the passage 73. It then passes through the dotted-line passage 74, and thence through nozzles connected therewith and through the wheel-buckets of the third stage and through the passage 75 and past the lowest stage-valves into the passage 76, (shown in dotted lines) to the nozzles connected therewith. If the valves 66 are depressed, so that the second set of ports 77 are uncovered, then fluid will flow from the passages 71, 73, and 75 in multiple through the dotted-line passages 72, 74, and 76 and the full-line passages 78, 79, and 80. By properly proportioning the actuating-cam the valve 66 may be made to fully open the first set of passages and by a further movement to open the second set of passages.

In the arrangement shown the stage-valves are operated by the governing mechanism and are set to open upon an increase in the number of admission-valves, and they are proportioned to maintain specified pressures in the stages for different load conditions of the turbine.

In accordance with the provisions of the patent statutes I have described the principle of operation of my invention, together with the apparatus which I now consider to represent the best embodiment thereof; but I desire to have it understood that the apparatus is only illustrative and that the invention can be carried out by other means.

What I claim as new, and desire to secure by Letters Patent of the United States, is—

1. In a governing mechanism for turbines, the combination of a plurality of valves which open and close in predetermined order to vary the amount of fluid admitted to the moving element, a means common to the valves for operating them, an actuator having a to-and-fro movement for moving the said means in a step-by-step manner, and a load-responsive device for connecting and disconnecting the actuator and means.

2. In a governing mechanism for turbines, the combination of a plurality of valves which open and close in predetermined order to vary the amount of fluid admitted to the moving element, a means common to the valves for operating them, an actuator comprising primary and secondary members one of which is connected to the said means, a source of power for imparting a constant to-and-fro movement to the other member of the actuator, and a connector responsive to load variations for connecting and disconnecting the members of the actuator as the load changes.

3. In a governing mechanism for turbines, the combination of a plurality of valves which open and close in predetermined order to vary the amount of fluid admitted to the moving element, a cam common to the valves for operating them in predetermined order, an actuator having a constant to-and-fro motion for moving the cam, and a load-responsive device for governing the action of the actuator on the cam.

4. In a governing mechanism for turbines, the combination of a plurality of valves which open and close in predetermined order to vary the amount of fluid admitted to the moving element, a means common to the valves for operating them, a divided actuator for moving the said means, one member of the actuator being in constant motion and another member having a step-by-step motion, and a connector responsive to load changes for connecting the said members for concerted action and disconnecting the members to permit of relatively independent movements.

5. In a governing mechanism for turbines, the combination of a plurality of valves which open and close in predetermined order to vary the amount of fluid admitted to the moving element, levers for operating the valves, a cam common to the levers for moving them, a constantly-moving actuator for moving the cam, and a device responsive to load changes for connecting and disconnecting the cam and actuator.

6. In a governing mechanism for turbines, the combination of a plurality of valves which open and close in predetermined order to vary the amount of fluid admitted to the moving element, levers for operating the valves, a cam common to the levers for moving them, an actuator which has a constant to-and-fro movement, and a connector for connecting the cam and actuator when it becomes necessary to open or close one or more valves, and to disconnect the cam and actuator when the load conditions are satisfied by the number of open valves.

7. In a governing mechanism for turbines, the combination of a plurality of valves which open and close in predetermined order to vary the amount of fluid admitted to the moving element, a means common to the valves for operating them, an actuator having a to-and-fro movement for moving the said means in a step-by-step manner, a rotary element which is connected to the actuator and imparts a to-and-fro movement thereto, and a load-responsive device which modifies the effect of the actuator on the valves.

8. In a governing mechanism for turbines, the combination of a plurality of valves which open and close in predetermined order to vary the amount of fluid admitted to the moving element, a means common to the valves for operating them, a divided actuator for moving said means, the principal members of which overlap, a connector acting on the members at the point of overlap for connecting and disconnecting them, and a speed-responsive device for governing the action of the connector.

9. In a governing mechanism for turbines, the combination of a plurality of valves which open and close in predetermined order to vary the amount of fluid admitted to the moving element, a divided actuator for moving the valves in their proper order, a guide for the actuator, a source of power for moving the actuator, and a device for connecting and disconnecting the parts of the actuator.

10. In a governing mechanism for turbines, the combination of a plurality of valves which open and close in predetermined order to vary the amount of fluid admitted to the moving element, a divided actuator for moving the valves in their proper order, one member of which is moving at all times and with a stroke of constant length while the other is moved forward and backward by a step-by-step movement, a connector for causing one member of the actuator to transmit motion to the other when it is necessary to move one or more valves, and to permit them to move relatively when the number of valves which are open satisfy the load requirements, and a governor for moving the connector.

11. In a governing mechanism for turbines, the combination of a plurality of valves which open and close in predetermined order to vary the amount of fluid admitted to the moving element, a means for moving the valves, an actuator which is constantly in motion for imparting motion to the means, a motor for moving the actuator, a guide on which the actuator is movable, and a device responding to load changes for regulating the action of the actuator.

12. In an elastic-fluid turbine, the combination of an admission-valve comprising a primary and a secondary element, with a means responsive to load changes for opening first one element of the valve with a snap-like action and then opening the other element.

13. In an elastic-fluid turbine, the combination of a plurality of admission-valves comprising primary and secondary elements, the primary element controlling a smaller amount of fluid than the secondary, and a means responsive to load changes for first opening the primary, then the secondary element of a given valve, and then the primary and afterward the secondary element of another valve, as the load increases.

14. In a governing mechanism for turbines, the combination of an admission-valve which comprises two principal elements, a primary and a secondary, a divided lever for actuating the said valve elements, a spring through which motion is transmitted from one part of the lever to the other, and a means responding to load changes for operating the lever.

15. In a governing mechanism for turbines, the combination of an admission-valve which comprises a primary and a secondary element, with a means responding to load changes which first opens the primary element with a snap-like action and then opens the secondary element of the valve as the demand for motive fluid changes.

16. In a governing mechanism for turbines, the combination of a plurality of admission-valves which comprise a primary element and a secondary element of larger area, and a speed-responsive device which opens first a primary and then a secondary element of the valves under conditions of increasing load.

17. In a governing mechanism for turbines, the combination of an admission-valve which comprises a pilot-valve and a main valve, a stem for first opening the pilot-valve to partially balance the pressures on the main valve, and thereafter opening the main valve, a load-responsive device for successively moving the parts of the valve as the demand for motive fluid changes, and a means for imparting a snap-like action to the pilot-valve as it opens.

18. In a governing mechanism for turbines, the combination of a plurality of admission-valves comprising two principal parts, a divided lever for each valve, springs through which the levers act on the valves to open them, springs for closing the valves, and a speed-responsive device for governing the action of the levers.

19. In a governing mechanism for turbines, the combination of a plurality of admission-valves, a cam common to the valves for moving them, a two-part actuator for moving the cam, one part being constantly driven by the turbine-shaft, the other geared to the cam, a connector for connecting and disconnecting the parts of the actuator, and a speed-responsive device for governing the action of the connector.

20. An elastic-fluid turbine which is divided into stages with wheel-buckets for the different stages, in combination with a stage-valve which controls a plurality of ports leading to discharge devices, admission-valves for regulating the admission of motive fluid to the turbine, and a mechanism responding to speed changes which positively moves the admission and stage valves.

21. An elastic-fluid turbine which is divided into stages with wheel-buckets for the different stages, in combination with stage-valves arranged for simultaneous action, a means for balancing the valves wholly or in part, an admission-valve, and a speed-responsive device which controls the movements of the admission and stage valves.

22. An elastic-fluid turbine which is divided into stages with wheel-buckets for the different stages, in combination with stage-valves arranged for simultaneous action, a plurality of ports controlled by each valve, a means tending to balance the valves, admission-valves, and a speed-responsive device for governing the action of the admission and stage valves.

23. In a governing mechanism for turbines, the combination of a valve regulating the passage of motive fluid, a means for moving it, an actuator comprising two principal and overlapping parts, which are capable of moving freely with respect to each other for moving said means, and a speed-responsive device for connecting and disconnecting the parts of the actuator as the load conditions change.

24. In a governing mechanism, the combination of a regulator, an actuator for moving it comprising primary and secondary members which are capable of moving with respect to each other, a load-responsive device, and a means moving with said device for locking and unlocking the members of the actuator.

25. In a governing mechanism, the combination of a regulating-valve, an actuator for moving it comprising primary and secondary members which when locked move the valve, a means for constantly imparting motion to the primary member of the actuator, and a means for locking the primary and secondary members when it is desired to move the valve and for unlocking them when it is desired to leave the valve in a given position.

26. In a governing mechanism for turbines, the combination of a plurality of regulators, means for operating said regulators dissimultaneously, a device which employs the energy of the main turbine-shaft and imparts a step-by-step action to said operating means, and a load-responsive mechanism which controls the action of said device without actuating it.

27. In a governing mechanism for turbines, the combination of a plurality of regulators, a device for successively moving the regulators as the load conditions change, an actuator for imparting a step-by-step action to the device, means for driving the actuator from the main turbine-shaft, and a load-responsive mechanism controlling the operation of said actuator on the device.

In witness whereof I have hereunto set my hand this 18th day of August, 1905.

EDGAR D. DICKINSON.

Witnesses:
BENJAMIN B. HULL,
HELEN ORFORD.